US008973155B2

(12) United States Patent
Iwai

(10) Patent No.: US 8,973,155 B2
(45) Date of Patent: Mar. 3, 2015

(54) LICENSE MANAGEMENT SYSTEM, LICENSE MANAGEMENT METHOD AND LICENSE MANAGEMENT PROGRAM

(75) Inventor: Kanako Iwai, Tokyo (JP)

(73) Assignee: NEC Corporation, Tokyo (JP)

(*) Notice: Subject to any disclaimer, the term of this patent is extended or adjusted under 35 U.S.C. 154(b) by 624 days.

(21) Appl. No.: 12/714,652

(22) Filed: Mar. 1, 2010

(65) Prior Publication Data
US 2010/0229231 A1 Sep. 9, 2010

(30) Foreign Application Priority Data
Mar. 4, 2009 (JP) .................. 2009-050461

(51) Int. Cl.
H04L 29/06 (2006.01)
G06F 21/60 (2013.01)
G06F 21/10 (2013.01)
(Continued)

(52) U.S. Cl.
CPC .............. *H04L 63/08* (2013.01); *G06F 21/604* (2013.01); *H04L 63/102* (2013.01); *H04L 63/104* (2013.01); *G06F 21/10* (2013.01); *G06F 2221/2117* (2013.01); *G06F 2221/2151* (2013.01); *H04N 21/2541* (2013.01); *H04N 21/25875* (2013.01); *H04N 21/8355* (2013.01)
USPC ................................ 726/28; 726/27; 713/182

(58) Field of Classification Search
CPC .... H04L 63/102; H04L 63/104; G06F 21/604
USPC ...................... 726/27, 28; 713/182
See application file for complete search history.

(56) References Cited

U.S. PATENT DOCUMENTS 7,103,663 B2* 9/2006 Inoue et al. .................. 709/225
7,254,584 B1* 8/2007 Addison, Jr. .................. 1/1
(Continued)

FOREIGN PATENT DOCUMENTS

JP 5-346851 A 12/1993
JP 10-058796 A 3/1998
(Continued)

OTHER PUBLICATIONS

Takabi, Hassan; Morteza, Amini; Jalili, Rasool; "Trust-Based User-Role Assignment in Role-Based Access Control", IEEE/ACS International Conference on Computer Systems and Applications, May 13-16, 2007, pp. 8-7-814.*

(Continued)

Primary Examiner — Victor Lesniewski
(74) Attorney, Agent, or Firm — Sughrue Mion, PLLC

(57) ABSTRACT

A license management system is connected to an authentication database holding information about license and user and manages a plurality of licenses. The system comprises a data receiving section, a data reading section and a license confirmation section. The data receiving section receives a user ID which is a code to identify a user. The data reading section reads out from the authentication database a user-type ID which is associated with the received user ID and is a code to identify the type of the user, and reads out from the authentication database a license ID which is associated with the user-type ID and is a code to identify the license. The license confirmation section confirms the content of a license which is associated with the read-out license ID and whether the license is correct on the basis of the confirmed content, and allows login by the user only when the license is correct.

8 Claims, 6 Drawing Sheets

(51) Int. Cl.
  *H04N 21/254* (2011.01)
  *H04N 21/258* (2011.01)
  *H04N 21/8355* (2011.01)

(56) References Cited

U.S. PATENT DOCUMENTS

| | | | | |
|---|---|---|---|---|
| 7,284,271 | B2* | 10/2007 | Lucovsky et al. | 726/21 |
| 7,302,634 | B2* | 11/2007 | Lucovsky et al. | 715/200 |
| 7,343,628 | B2* | 3/2008 | Buchholz et al. | 726/28 |
| 7,496,919 | B1* | 2/2009 | Mishra et al. | 718/103 |
| 7,568,217 | B1* | 7/2009 | Prasad et al. | 726/3 |
| 7,664,724 | B2* | 2/2010 | Lucovsky et al. | 707/781 |
| 7,676,498 | B2* | 3/2010 | England et al. | 707/999.107 |
| 8,060,932 | B2* | 11/2011 | Mohammed et al. | 726/21 |
| 8,302,201 | B1* | 10/2012 | Gupta et al. | 726/26 |
| 8,365,263 | B2* | 1/2013 | Dasch et al. | 726/7 |
| 8,387,117 | B2* | 2/2013 | Eom et al. | 726/4 |
| 8,402,514 | B1* | 3/2013 | Thompson et al. | 726/4 |
| 8,763,155 | B1* | 6/2014 | Ben Chetrit et al. | 726/29 |
| 2003/0050911 | A1* | 3/2003 | Lucovsky et al. | 707/1 |
| 2003/0154380 | A1* | 8/2003 | Richmond et al. | 713/182 |
| 2005/0289072 | A1* | 12/2005 | Sabharwal | 705/59 |
| 2006/0117390 | A1* | 6/2006 | Shrivastava et al. | 726/27 |
| 2007/0067851 | A1* | 3/2007 | Fernando et al. | 726/26 |
| 2008/0016580 | A1* | 1/2008 | Dixit et al. | 726/27 |
| 2008/0215560 | A1* | 9/2008 | Bell et al. | 707/5 |
| 2008/0244736 | A1* | 10/2008 | Lampson et al. | 726/21 |
| 2008/0301771 | A1* | 12/2008 | Kawai et al. | 726/2 |
| 2009/0183228 | A1* | 7/2009 | Dasch et al. | 726/1 |
| 2009/0183244 | A1* | 7/2009 | Saraf et al. | 726/6 |
| 2009/0199293 | A1* | 8/2009 | Song et al. | 726/18 |
| 2011/0061008 | A1* | 3/2011 | Gupta et al. | 715/764 |

FOREIGN PATENT DOCUMENTS

| | | |
|---|---|---|
| JP | 2001-344419 A | 12/2001 |
| JP | 2003-122537 A | 4/2003 |
| JP | 2004343655 | 12/2004 |
| JP | 2005149382 A | 6/2005 |
| JP | 2005-228310 A | 8/2005 |
| JP | 2006172398 | 6/2006 |
| JP | 2006260085 | 9/2006 |
| JP | 2006-330842 A | 12/2006 |

OTHER PUBLICATIONS

Wang, Jin; Li, Daxing; Li, Qiang; Xi, Bai; "Constructing Role-Based Access Control and Delegation Based on Hierarchical IBS", IFIP International Conference on Network and Parallel Computing Workshops, Sep. 18-21, 2007, pp. 112-118.*

Japanese Office Action for JP 2009-050461 mailed on Apr. 4, 2013 with English Translation.

* cited by examiner

FIG.3

DATA STRUCTURE OF USER INFORMATION 121

| USER ID | USER-TYPE ID | ... |
|---------|--------------|-----|
| U-00001 | UT-00001 | ... |

FIG.4

DATA STRUCTURE OF USER-TYPE INFORMATION 123

| USER-TYPE ID | LICENSE ID | ... |
|--------------|------------|-----|
| UT-00001 | L-00001 | ... |

DATA STRUCTURE OF APPLICATION FUNCTION INFORMATION

DATA STRUCTURE OF LICENSE INFORMATION

DATA STRUCTURE OF AUTHENTICATION CONFIRMATION INFORMATION

LICENSE MANAGEMENT SYSTEM, LICENSE MANAGEMENT METHOD AND LICENSE MANAGEMENT PROGRAM

This application is based upon and claims the benefit of priority from prior Japanese Patent Application No. 2009-050461 filed Mar. 4, 2009, the entire contents of which are incorporated herein.

TECHNICAL FIELD

The present invention relates to license management of a system that manages the number of users who use the system, expiration dates and the like using license.

BACKGROUND ART

The use of services or systems of a kind that charge not only according to functions or applications to be provided but to the number of accounts registered in systems or the number of times users log in to applications has become widespread. For such services or systems, it is important to manage users' licenses (the number of accounts) in accordance with applications.

In such systems, it is necessary to manage licenses classified by type of user, such as users who should not be counted as accounts and users who should be counted as those based on the other licenses. More specifically, it may be necessary to separately manage the number of licenses, expiration dates or the like according to type of user, such as ordinary users who use a system, users who temporarily use for evaluation or the like, and users who administer the system (see PTL 1, for example).

CITATION LIST

Patent Literature

{PTL 1} JP-A-05-346851

SUMMARY OF INVENTION

Technical Problem

According to the method disclosed in PTL 1 and the like, it is necessary for authentication servers that manage user information to register types of license as information about respective users, or for servers that carry out license management to manage users and types of license using correspondence tables and the like.

In such systems, when registering users, system administrators are required to manage users by judging licenses of respective users, such as registering in user information the license information that should be checked and adding users to the license-type correspondence tables. The problem is that it is difficult and troublesome for the system administrators to carry out user management.

The object of the present invention is to provide a license management system, a license management method and a license management program that can manage licenses classified by type of user and reduce a burden on administrators by automatically registering a user-type ID from a user manipulation.

Solution to Problem

According to a first aspect of the present invention, there is provided a license management system that is connected to an authentication database holding information about license and user and manages a plurality of licenses, including: a data receiving section for receiving a user ID which is a code to identify a user; a data reading section for reading out from the authentication database a user-type ID which is associated with the received user ID and is a code to identify the type of the user, and reading out from the authentication database a license ID which is associated with the user-type ID and is a code to identify the license; and a license confirmation section for confirming the content of a license which is associated with the read-out license ID and whether the license is correct on the basis of the confirmed content, and allowing login by the user only when the license is correct.

According to a second aspect of the present invention, there is provided a license management method of managing a plurality of licenses in a license management system connected to an authentication database holding information about license and user, including: a data receiving step of receiving a user ID which is a code to identify a user; a data reading step of reading out from the authentication database a user-type ID which is associated with the received user ID and is a code to identify the type of the user, and reading out from the authentication database a license ID which is associated with the user-type ID and is a code to identify the license; and a license confirmation step of confirming the content of a license which is associated with the read-out license ID and whether the license is correct on the basis of the confirmed content, and allowing login by the user only when the license is correct.

According to a third aspect of the present invention, there is provided a license management program that is installed on a license management system connected to an authentication database holding information about license and user, manages a plurality of licenses and causes a computer to function as the license management system, wherein the license management system includes: a data receiving section for receiving a user ID which is a code to identify a user; a data reading section for reading out from the authentication database a user-type ID which is associated with the received user ID and is a code to identify the type of the user, and reading out from the authentication database a license ID which is associated with the user-type ID and is a code to identify the license; and a license confirmation section for confirming the content of a license which is associated with the read-out license ID and whether the license is correct on the basis of the confirmed content, and allowing login by the user only when the license is correct.

Advantageous Effects of Invention

According to the present invention, the user-type ID helps to separate the licenses that should be checked, making it possible to reduce a burden on administrators.

DESCRIPTION OF EMBODIMENTS

According to the exemplary embodiment of the present invention will be described hereinafter. The present exemplary embodiment, in a system that manages the number of users who use the system and the like as license, a system administrator can determine licenses corresponding to respective users without distinguishing among types of users' licenses when the number of licenses, expiration dates and the like are separately managed according to type of user, such as ordinary users who use a system, users who temporarily use for evaluation or the like, and users who administer systems.

According to the present exemplary embodiment, the type of a user is automatically determined from a function that the user logs in to or a screen that the user operates, and license management is carried out. For example, suppose that only a specific administration user can log in to a certain administration function.

More specifically, when the user logs in to the administration function, information indicating that that the user has logged in is transmitted to a license management system. In the license management system, a user ID of the user and a user-type ID indicating the type of the user (i.e. the fact that the user is administrator) are saved.

The license management system holds in advance a correspondence table of user-type IDs and license information that the user-type IDs should check.

When the license is to be confirmed at the time of login, the user-type ID corresponding to a login user is confirmed and the license corresponding to the user-type ID is checked. Therefore, the license of each user is confirmed. When the corresponding licenses are to be changed, the correlation between the license information and the user-type IDs is changed. Therefore, the license information that should be checked can be easily changed.

The configuration of the present exemplary embodiment will be described in detail with reference to the accompanying drawings.

Figure 1:
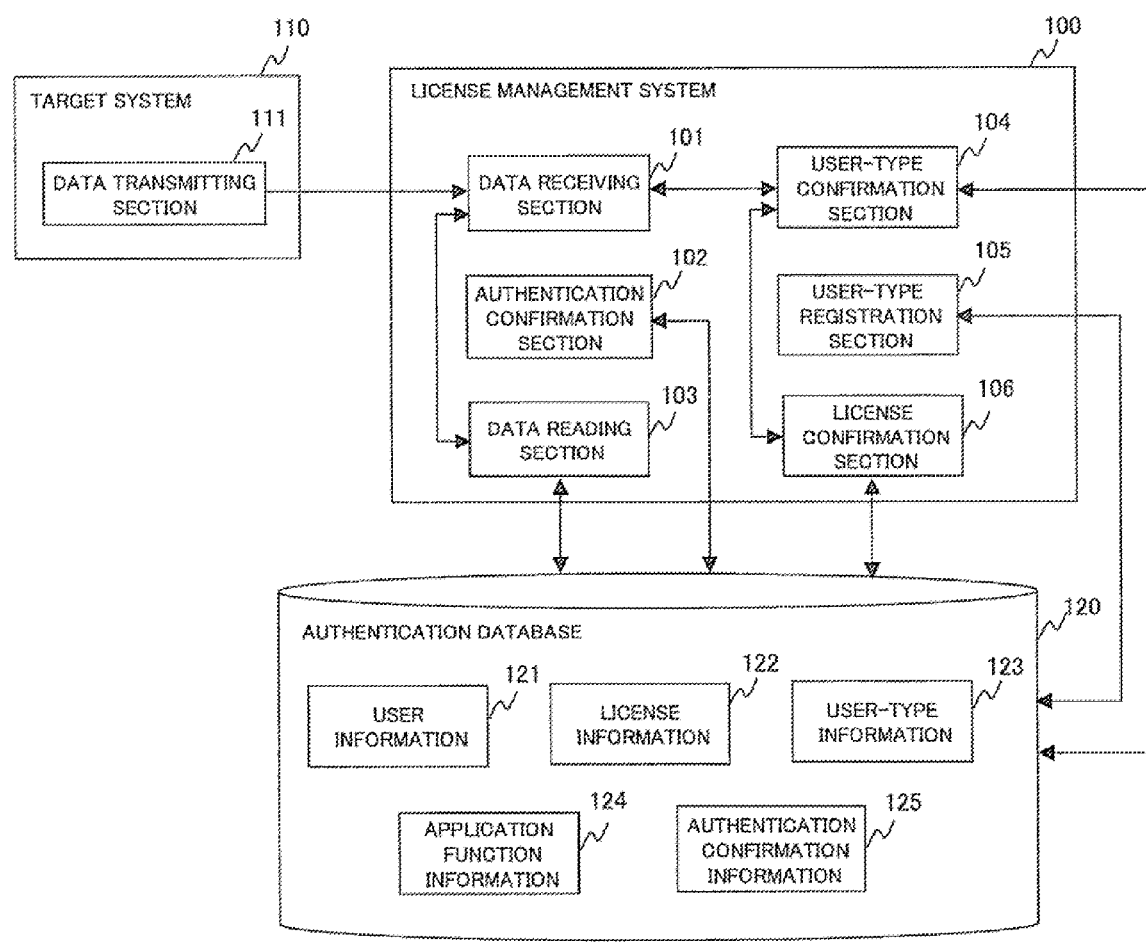
FIG. 1 A block diagram illustrating the fundamental configuration of an exemplary embodiment of the present invention FIG. 2 A flowchart illustrating the fundamental operation of the exemplary embodiment of the present invention FIG. 3 A diagram illustrating the fundamental configuration of user information according to the exemplary embodiment of the present invention FIG. 4 A diagram illustrating the fundamental configuration of user-type information according to the exemplary embodiment of the present invention FIG. 5 A diagram illustrating the fundamental configuration of application function information according to the exemplary embodiment of the present invention FIG. 6 A diagram illustrating the fundamental configuration of license information according to the exemplary embodiment of the present invention FIG. 7 A diagram illustrating the fundamental configuration of authentication confirmation information according to the exemplary embodiment of the present invention FIG. 8 A flowchart (1/2) illustrating the fundamental operation of the exemplary embodiment of the present invention FIG. 9 A flowchart (2/2) illustrating the fundamental operation of the exemplary embodiment of the present invention

FIG. 1 is a block diagram illustrating the fundamental configuration of the present exemplary embodiment.

A license management system 100 of the present exemplary embodiment is connected to a target system 110 and an authentication database 120.

The license management system 100 includes a data receiving section 101, an authentication confirmation section 102, a data reading section 103, a user-type confirmation section 104, a user-type registration section 105, and a license confirmation section 106.

The data receiving section 101 is a section that receives information transmitted from a data transmitting section 111 of the target system 110.

The authentication confirmation section 102 is a section that makes inquiries to the authentication database 120 as to whether a combination of a user ID and a password is correct to make confirmation.

The data reading section 103 is a section that reads out information stored in the authentication database 120.

The user-type confirmation section 104 is a section that determines the user-type ID from function information 124 of the authentication database 120 and from a function ID of a function that the user has logged in to.

The user-type registration section 105 is a section that registers the user-type ID in user information 121 of the authentication database 120.

The license confirmation section 106 is a section that confirms whether the license is correct.

The target system 110 includes the data transmitting section 111.

After a user logs in to the target system 110, the data transmitting section 111 transmits to the license management system 100 the user ID, the password, and the function ID representing the function of a login-target application.

The authentication database 120 is a database holding various kinds of information. More specifically, the authentication database 120 holds the user information 121, license information 122, user-type information 123, the application function information 124, and authentication confirmation information 125.

The following describes the data structures of each type of information according to the exemplary embodiment of the present invention, with reference to FIGS. 3 to 7. FIGS. 3 to 7 are diagrams illustrating the data structures of each type of information of the present exemplary embodiment. The content of information shown in FIGS. 3 to 7 is only given for illustrative purposes. Additional content may be added when necessary; the content may be replaced.

FIG. 3 illustrates the data structure of the "user information 121." The user information 121 retains the "user IDs" that are IDs to identify users; and the "user-type IDs" that are IDs representing type of user such as whether the users are administrator. Moreover, the user IDs and the user-type IDs are so managed as to be associated with one another.

FIG. 4 illustrates the data structure of the "user-type information 123." The user-type information 123 retains the user-type IDs and "license IDs" that are IDs to identify licenses to be checked. Moreover, the user-type IDs and the license IDs are so managed as to be associated with one another.

Figure 5:
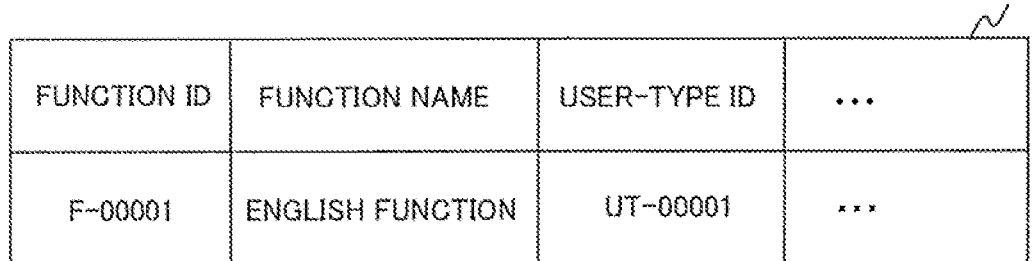

FIG. 5 illustrates the data structure of the "application function information 124." The application function information 124 retains "function names" that represent names of certain functions; "function IDs" that are IDs to identify functions; and the user-type IDs. Moreover, the functions that users use and the user-type IDs of users who use the functions are so managed as to be associated with one another.

Figure 6:
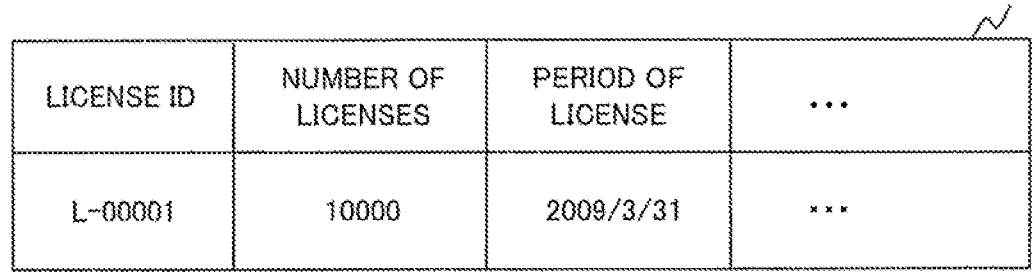

FIG. 6 illustrates the data structure of the "license information 122." The license information 122 retains the license IDs, the number of licenses of the license IDs, and the license periods of the license IDs (the expiration dates of the licenses) and controls the content of the license that should be checked.

Figure 7:

FIG. 7 illustrates the data structure of the "authentication confirmation information 125," in which the user IDs and the passwords of the user IDs are so held as to be associated with one another.

Figure 2:
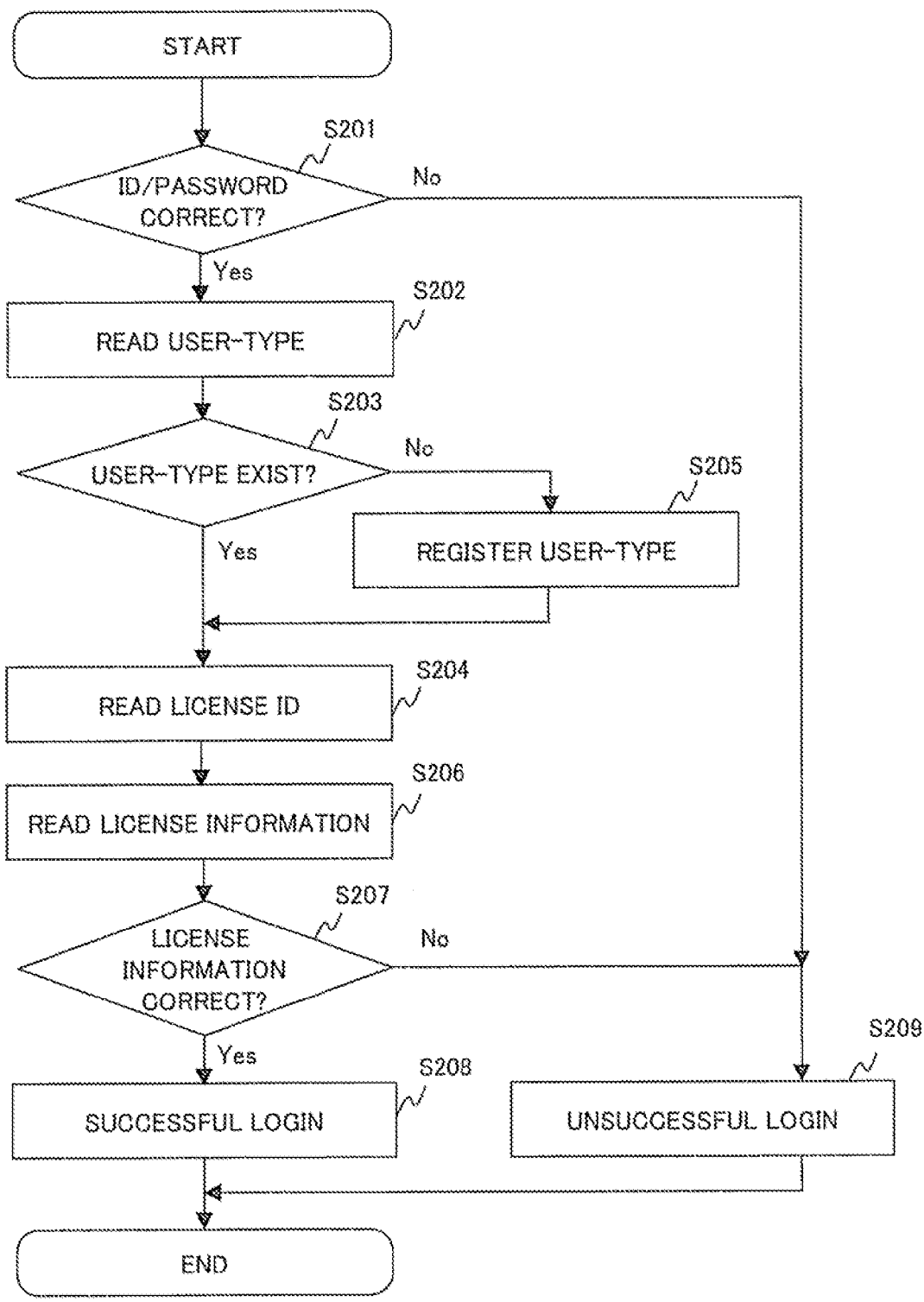

The following describes the operation of the exemplary embodiment of the present invention with reference to FIGS. 1 to 7. FIG. 2 is a flowchart illustrating the processing operation of the license management system 100 when a user logs in to the target system 110.

Described here in the present exemplary embodiment is an example of the operation when a user who logs in to a system's administration screen is determined to be an administrator and the user is regarded as having special authority for processing.

After a user of the system logs into the target system 110, the data transmitting section 111 transmits to the license management system 100 the user ID (The user ID of the user is "U-00001" in this case), the password, and the function ID (the function ID is "F-00001" in this case) representing the function of a login-target application.

In the license management system 100, the data receiving section 101 receives the above information; the authentication confirmation section 102 makes inquiries to the authentication database 120 as to whether the combination of the user ID and the password is correct (Step S201).

When the combination of the user ID and the password is wrong (No at step S201), the login fails (Step S209) and the process ends.

When the combination of the user ID and the password is correct (Yes at step S201), the data reading section 103 reads out the user-type ID (The user-type ID is "UT-00001" in this case) corresponding to the user ID "U-00001" from the user information 121 stored in the authentication database 120 (Step S202).

When the user-type ID that the data reading section 103 tries to read out does not exist (No at step S203), the user-type confirmation section 104 determines the user-type ID "UT-00001" on the basis of the function information 124 of the authentication database 120 and the function ID that the data transmitting section 111 has transmitted. The user-type registration section 105 then registers the user-type ID "UT-00001" in the user information 121 of the authentication database 120 (Step S205).

When the user-type ID exists (Yes at step S203), the data reading section 103 reads out the user-type ID and the step S205 is skipped.

The data reading section 103 then reads out the license ID (The license ID is "L-00001" in this case) corresponding to the user-type ID "UT-00001" from the user-type information 123 of the authentication database 120 (Step S204).

Subsequently, the data reading section 103 reads out the license information corresponding to the license ID "L-00001" acquired at step S204 from the license information 122 of the authentication database 120 (Step S206).

The license confirmation section 106 confirms whether the license is correct on the basis of the license information read at step S206 (Step S207). Whether the license is correct is determined by such criteria as whether the number of licenses is within a range and whether the license is not expired, or the determination may be made on the basis of the other information.

When the license information is correct (Yes at step S207), the login succeeds (Step S208) and the process ends. When the license information is wrong (No at step S207), the login fails (Step S209) and the process ends.

EXAMPLE 1

Figure 8:
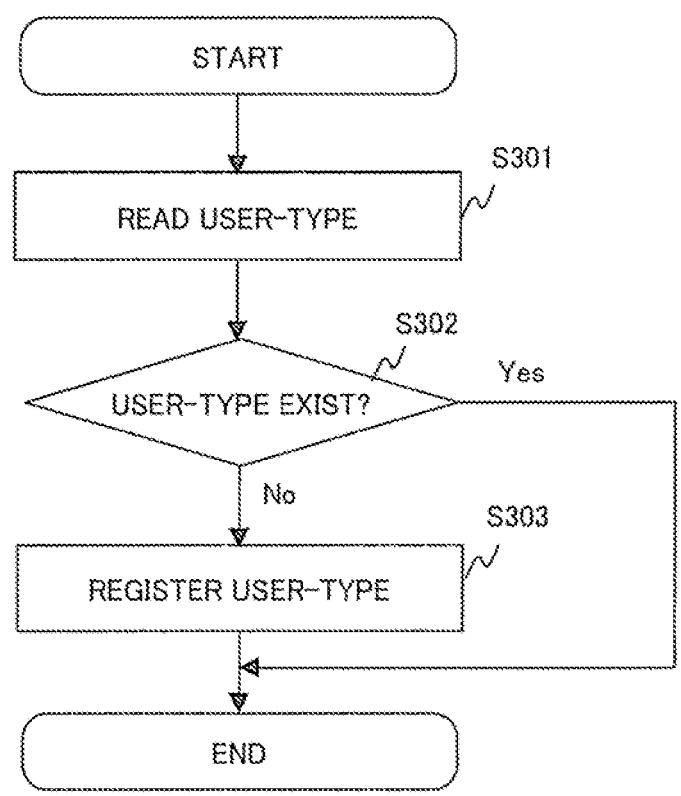
Figure 9:
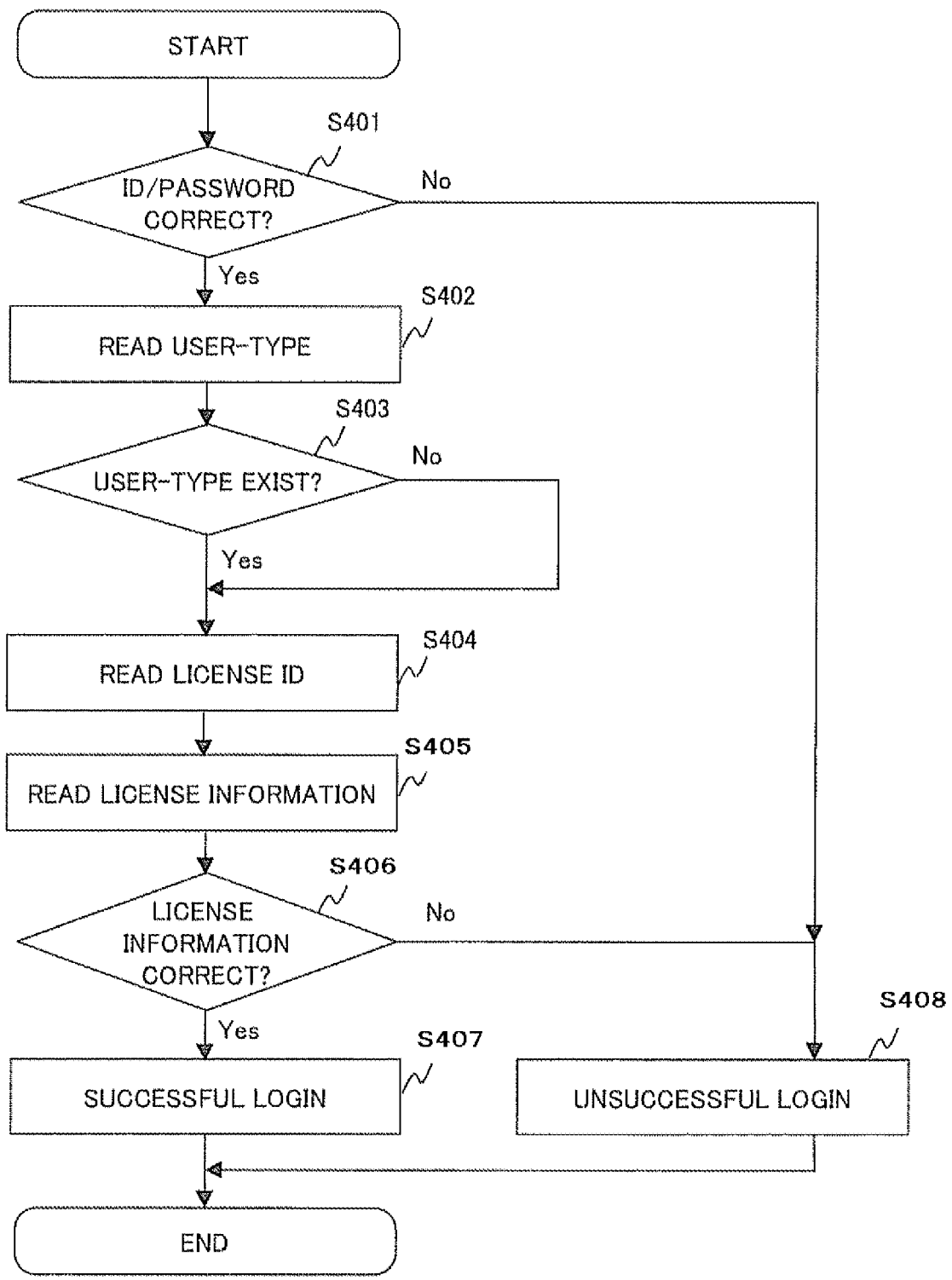

The following describes an example of the present invention with reference to a block diagram in FIG. 1 and flowcharts in FIGS. 8 and 9.

In the example here, a system separately manages the licenses of users who use English and the licenses of users who use Japanese. Although the same information is registered in the authentication server for the users who use English and the users who use Japanese, the functions (screens) to be used may be switched. Described below is a configuration in which licenses are separately issued for an English-only function (screen) as optional product and, only when a link to the English screen is displayed, license checking for use of English is performed.

The operation at the time of manipulation will be described first with reference to a flowchart of FIG. 8.

Suppose that after a user of the system logs in to the target system 110, the user selects the link to the English screen. In response, the data transmitting section 111 transmits the user ID (U-00001) and information representing the English function to the license management system 100.

In the license management system 100, the data receiving section 101 receives the above information. The data reading section 103 reads out the user-type ID (UT-00001) from the user information 121 of the authentication database 120 (Step S301).

The user-type confirmation section 104 confirms whether the user-type ID (UT-00001) exists (Step S302).

When the user-type ID (UT-00001) does not exist (No at step S302), the user-type confirmation section 104 determines the user-type ID (UT-00001) on the basis of the function ID of the function (English function) that the user has logged in to. Subsequently, the user-type registration section 105 registers the user-type ID (UT-00001) in the user information 121 of the authentication database 120 (Step S303) and ends the process.

When the user-type ID (UT-00001) exists (Yes at step S302), the step S303 is skipped to end the process.

The following describes the operation at the time of login with reference to a flowchart of FIG. 9.

After a user of the system logs in to the target system 110, the data transmitting section 111 transmits to the license management system 100 the user ID (U-00001), the password, and the function ID indicating the function that the user logs in to.

In the license management system 100, the data receiving section 101 receives the above information. The authentication confirmation section 102 makes inquiries to the authentication database 120 as to whether the ID and the password are correct (Step S401).

When the ID and the password are incorrect (No at step S401), the login fails (step S408) and the process ends.

When the ID and the password are correct (Yes at step S401), the data reading section 103 reads out the user-type ID (UT-00001) from the user information 121 of the authentication database 120 (Step S402).

Then, a confirmation is made as to whether the user-type ID (UT-00001) that the data reading section 103 reads out exists (Step S403).

When the user-type ID (UT-00001) exists (Yes at step S403), the data reading section 103 reads out the corresponding license ID (L-00001) from the user-type information 123 of the authentication database 120 (Step S404).

When the user-type ID (UT-00001) does not exist (No at step S403), a default user license ID (L-00000) is set. Incidentally, the user license ID (L-00000) is a license for the basic function of Japanese, not for the optional function of English. In the example here, suppose that the license ID (L-00001) is read at step S404.

Subsequently, the data reading section 103 reads out the license information 122 of the authentication database 120 corresponding to the license ID (L-00001) acquired at step S404 (Step S405).

The license confirmation section 106 confirms whether the license is correct (Step S406).

When the license information is correct (Yes at step S406), the login succeeds (Step S407) and the process ends. When the license information is wrong (No at step S406), the login fails (step S408) and the process ends.

EXAMPLE 2

In the second example, priority levels of the licenses that should be checked may be switched by adding a "priority level" to the data structure of the user-type information shown in FIG. 4.

When the user-type ID is confirmed at step S203 of FIG. 2, the following IDs are compared in terms of priority level: the user-type ID that have already been registered as user information, and the user-type ID that is associated in the function information 124 of the authentication database 120 with the function ID identified by the user's manipulation.

When the priority level of the user-type ID already registered as user information is higher, then the process of confirming the license follows. When the priority level of the user-type ID associated by the user's manipulation is higher, the user-type ID in the user information is rewritten before the process of confirming the license.

The exemplary embodiment of the present invention described above provides the following effects.

The first effect is that since the user-type IDs and the license IDs are associated with one another, the licenses that should be checked are automatically separated.

The second effect is that since the function ID is determined by the user's manipulation, the users are automatically associated with the licenses that should be checked even when the user-type IDs are not registered.

The third effect is that since the licenses that should be checked are automatically separated as described above and since the users are automatically associated with the licenses that should be checked even when the user-type IDs are not registered, the system administrator does not have to know the license of each user that should be registered.

The fourth effect, like the third effect, is that since the licenses that should be checked are automatically separated as described above and since the users are automatically associated with the licenses that should be checked even when the user-type IDs are not registered, the users do not have to know the licenses that should be registered.

Incidentally, the license management system, the target system and the authentication database of the exemplary embodiment of the present invention can be realized by hardware, software, or a combination of hardware and software.

The exemplary embodiment described above is a preferred exemplary embodiment of the present invention. However, the scope of the present invention is not limited only to the above exemplary embodiment. The present invention may be embodied with various modifications without departing from the essentials of the present invention.

The whole of part of the exemplary embodiments disclosed above can be described as, but not limited to, the following supplementary notes.

(Supplementary note 1) A license management system that is connected to an authentication database holding information about license and user and manages a plurality of licenses, comprising: a data receiving section for receiving a user ID which is a code to identify a user; a data reading section for reading out from the authentication database a user-type ID which is associated with the received user ID and is a code to identify the type of the user, and reading out from the authentication database a license ID which is associated with the user-type ID and is a code to identify the license; and a license confirmation section for confirming the content of a license which is associated with the read-out license ID and whether the license is correct on the basis of the confirmed content, and allowing login by the user only when the license is correct.

(Supplementary note 2) The license management system according to Supplementary note 1, wherein: the data receiving section further receives a function ID which is a code to identify an application function; and the license management system further includes user-type registration section for reading out from the authentication database a user-type ID associated with the function ID received by the data receiving section when the user-type ID is not read out by the data reading section, and registering the user-type ID in the authentication database so that the user-type ID is associated with the user ID.

(Supplementary note 3) The license management system according to Supplementary note 2, wherein: the user-type IDs are each given a priority level; and even when the user-type ID is read out by the data reading section, the user-type registration section reads out from the authentication database a user-type ID associated with the function ID received by the data receiving section, compares the priority levels given to the two user-type IDs, and registers in the authentication database the user-type ID whose priority level is higher so that the user-type ID is associated with the user ID.

(Supplementary note 4) The license management system according to any one of Supplementary notes 1 to 3, wherein: the data receiving section further receives a password; and the license management system further includes authentication confirmation section for making inquiries to the authentication database as to whether a combination of the user ID that the data receiving section receives and the password is correct, and prohibiting the user from logging in when the combination is incorrect.

(Supplementary note 5) A license management method of managing a plurality of licenses in a license management system connected to an authentication database holding information about license and user, the method comprising: a data receiving step of receiving a user ID which is a code to identify a user; a data reading step of reading out from the authentication database a user-type ID which is associated with the received user ID and is a code to identify the type of the user, and reading out from the authentication database a license ID which is associated with the user-type ID and is a code to identify the license; and a license confirmation step of confirming the content of a license which is associated with the read-out license ID and whether the license is correct on the basis of the confirmed content, and allowing login by the user only when the license is correct.

(Supplementary note 6) The license management method according to Supplementary note 5, wherein: the data receiving step further receives a function ID which is a code to identify an application function; and the license management method further includes a user-type registration step of reading out from the authentication database a user-type ID associated with the function ID received in the data receiving step when the user-type ID is not read out in the data reading step, and registering the user-type ID in the authentication database so that the user-type ID is associated with the user ID.

(Supplementary note 7) The license management method according to Supplementary note 6, wherein: the user-type IDs are each given a priority level; and even when the user-type ID is read out in the data reading step, the user-type registration step reads out from the authentication database a user-type ID associated with the function ID received in the data receiving step, compares the priority levels given to the two user-type IDs, and registers in the authentication database the user-type ID whose priority level is higher so that the user-type ID is associated with the user ID.

(Supplementary note 8) The license management method according to Supplementary notes 5 to 7, wherein: the data receiving step further receives a password; and the license management method further includes an authentication confirmation step of making inquiries to the authentication database as to whether a combination of the user ID received in the data receiving step and the password is correct, and prohibiting the user from logging in when the combination is incorrect.

(Supplementary note 9) A computer-readable medium stored therein a license management program that is installed on a license management system connected to an authentication database holding information about license and user, manages a plurality of licenses and causes a computer to function as the license management system, wherein the license management system includes: a data receiving section for receiving a user ID which is a code to identify a user; a data reading section for reading out from the authentication database a user-type ID which is associated with the received user ID and is a code to identify the type of the user, and reading out from the authentication database a license ID which is associated with the user-type ID and is a code to identify the license; and a license confirmation section for confirming the content of a license which is associated with the read-out license ID and whether the license is correct on the basis of the confirmed content, and allowing login by the user only when the license is correct.

(Supplementary note 10) The computer-readable medium according to Supplementary note 9, wherein: the data receiving section further receives a function ID which is a code to identify an application function; and the license management system further includes user-type registration section for reading out from the authentication database a user-type ID associated with the function ID received by the data receiving section when the user-type ID is not read out by the data reading section, and registering the user-type ID in the authentication database so that the user-type ID is associated with the user ID.

(Supplementary note 11) The computer-readable medium according to claim 10, wherein: the user-type IDs are each given a priority level; and even when the user-type ID is read out by the data reading section, the user-type registration section reads out from the authentication database a user-type ID associated with the function ID received by the data receiving section, compares the priority levels given to the two user-type IDs, and registers in the authentication database the user-type ID whose priority level is higher so that the user-type ID is associated with the user ID.

(Supplementary note 12) The computer-readable medium according to Supplementary notes 9 to 11, wherein: the data receiving section further receives a password; and the license management system further includes authentication confirmation section for making inquiries to the authentication database as to whether a combination of the user. ID that the data receiving section receives and the password is correct, and prohibiting the user from logging in when the combination is incorrect.

The invention claimed is:

1. A license management system that is connected to an authentication database comprising a first data group in which user IDs and user-type IDs are associated with one another and a second data group in which application function IDs and the user-type IDs are associated with one another, the user-type IDs being each given a priority level, the license management system comprising:
a data receiver configured to receive a user ID and an application function ID, the user ID being a code to identify a user, the application function ID being a code to identify an application function and being identified by a user's operation of a screen for an application function;
a data reader configured to determine whether a user-type ID, which is associated with the user ID received by the data receiver and is a code to identify the type of the user, exists in the first data group of the authentication database, to read out the user-type ID from the authentication database if the user-type ID exists, to read out from the second data group of the authentication database a user-type ID associated with the application function ID received by the data receiver, to compare the priority levels given to the two user-type IDs, and to read out from the authentication database a license ID which is associated with the user-type ID whose priority level is higher, the license ID being a code to identify the license, the data reader being further configured to, when the user-type ID does not exist as a result of determination by the data reader, read out from the second data group of the authentication database a user-type ID associated with the application function ID, and to read out from the authentication database a license ID associated with the user-type ID;
a license confirmation processor configured to confirm the content of a license which is associated with the license ID read out by the reader from the authentication database and whether the license is correct on the basis of the confirmed content, and to allow login by the user only when the license is correct; and
a user-type registration processor configured to, when any user-type ID associated with the user ID does not exist in the first data group of the authentication database as a result of determination by the data reader, register the user-type ID, which is read out from the second data group of the authentication database, in the first data group of the authentication database so that the user-type ID is associated with the user ID, the user-type registration processor being further configured to, when any user-type ID associated with the user ID exists in the first data group of the authentication database as a result of determination by the data reader, register in the first data group of the authentication database the user-type ID whose priority level is higher so that the user-type ID is associated with the user ID.

2. The license management system according to claim 1, wherein:
the data receiver further receives a password; and
the license management system further includes an authentication confirmation processor which makes inquiries to the authentication database as to whether a combination of the user ID that the data receiver receives and the password is correct, and prohibits the user from logging in when the combination is incorrect.

3. The license management system according to claim 1, wherein:
the receiver receives an application function ID, which is a code to identify an application function corresponding to user's operation, along with the user ID, and
the data reader reads out the user-type ID associated with the application function ID, from the authentication database.

4. The license management system according to claim 1, wherein
the license confirmation processor confirms, as the content of the license, at least one of whether a number of licenses are within a range and whether the license is not expired.

5. A license management method of managing a plurality of licenses in a license management system connected to an authentication database comprising a first data group in which user IDs and user-type IDs are associated with one another and a second data group in which application function IDs and the user-type IDs are associated with one another, the user-type IDs being each given a priority level, the method comprising:
- a data receiving step that a data receiver receives a user ID and an application function ID, the user ID being a code to identify a user, the application function ID being a code to identify an application function and being identified by a user's operation of a screen for an application function;
- a data reading step that a data reader determines whether a user-type ID, which is associated with the received user ID and is a code to identify the type of the user, exists in the first data group of the authentication database, read out the user-type ID from the authentication database if the user-type ID exists, reads out from the second data group of the authentication database a user-type ID associated with the application function ID received by the data receiver, compares the priority levels given to the two user-type IDs, and reads out from the authentication database a license ID which is associated with the user-type ID whose priority level is higher, the license ID being a code to identify the license, and the data reader further, when the user-type ID does not exist as a result of determination by the data reader, reads out from the second data group of the authentication database a user-type ID associated with the application function ID, and reads out from the authentication database a license ID associated with the user-type ID;
- a license confirmation step that a license confirmation processor confirms the content of a license which is associated with the read-out license ID and whether the license is correct on the basis of the confirmed content, and allows login by the user only when the license is correct; and
- a user-type registration step that a user-type registration processor, when any user-type ID associated with the user ID does not exist in the first data group of the authentication database as a result of determination by the data reader, registers the user-type ID which is read out from the second data group of the authentication database, in the first data group of the authentication database so that the user-type ID is associated with the user ID, and the user-type registration processor further, when any user-type ID associated with the user ID exists in the first data group of the authentication database as a result of determination by the data reader, register in the first data group of the authentication database the user-type ID whose priority level is higher on that the user-type ID is associated with the user ID.

6. The license management method according to claim 5, wherein:
the data receiving step further receives a password; and
the license management method further includes an authentication confirmation step that an authentication confirmation processor makes inquiries to the authentication database as to whether a combination of the user ID received in the data receiving step and the password is correct, and prohibits the user from logging in when the combination is incorrect.

7. A non-transitory computer-readable medium stored therein a license management program that is installed on a license management system connected to an authentication database comprising a first data group in which user IDs and user-type IDs are associated with one another and a second data group in which application function IDs and the user-type IDs are associated with one another, the user-type IDs being each given a priority level, the license management program causing a computer to function as the license management system, wherein
the license management system includes:
- a data receiver configured to receive a user ID and an application function ID, the user ID being a code to identify a user, the application function ID being a code to identify an application function and being identified by a user's operation of a screen for an application function;
- a data reader configured to determine whether a user-type ID, which is associated with the received user ID and is a code to identify the type of the user, exists in the first data group of the authentication database, to read out the user-type ID from the authentication database if the user-type ID exists, to read out from the second data group of the authentication database a user-type ID associated with the application function ID received by the data receiver, to compare the priority levels given to the two user-type IDs, and to read out from the authentication database a license ID which is associated with the user-type ID whose priority level is higher, the license ID being a code to identify the license, the data reader being further configured to, when the user-type ID does not exist as a result of determination by the data reader, read out from the second data group of the authentication database a user-type ID associated with the application function ID, and to read out from the authentication database a license ID associated with the user-type ID;
- a license confirmation processor configured to confirm the content of a license which is associated with the read-out license ID and whether the license is correct on the basis of the confirmed content, and to allow login by the user only when the license is correct; and
- a user-type registration processor configured to, when any user-type ID associated with the user ID does not exist in the first data group of the authentication database as a result of determination by the data reader, register the user-type ID, which is read out from the second data group of the authentication database, in the first data group of the authentication database so that the user-type ID is associated with the user ID, the user-type registration processor being further configured to, when any user-type ID associated with the user ID exists in the first data group of the authentication database as a result of determination by the data reader, register in the first data group of the authentication database the user-type ID whose priority level is higher so that the user-type ID is associated with the user ID.

8. The non-transitory computer-readable medium according to claim 7, wherein:
the data receiver further receives a password; and
the license management system further includes authentication confirmation processor which makes inquiries to the authentication database as to whether a combination of the user ID that the data receiver receives and the password is correct, and prohibits the user from logging in when the combination is incorrect.

* * * * *